March 11, 1952     J. S. MALSBARY     2,588,642

ANTIBACKLASH COUPLING

Filed July 31, 1946

INVENTOR
JAMES S. MALSBARY
BY
ATTORNEY

Patented Mar. 11, 1952

2,588,642

UNITED STATES PATENT OFFICE 2,588,642

ANTIBACKLASH COUPLING

James S. Malsbary, Glendale, Mo., assignor to Wagner Electric Corporation, St. Louis, Mo., a corporation of Delaware Application July 31, 1946, Serial No. 687,437

7 Claims. (Cl. 74—242.8)

This invention relates to a mechanism for transmitting motion from one member to another and in its more specific aspects is directed to a novel pulley and belt arrangement whereby rotation is transmitted from one shaft to another and in which backlash or slack is eliminated in either direction of rotation.

The principal object of this invention is to provide mechanism for transmitting motion from a driving member to a driven member and which has means incorporated therein to adjust the several members with respect to each other for the elimination of slack and which may be easily insulated in the event that the mechanism is employed on current carrying members of an electrical apparatus.

In the drawings Figure 1 is a plan view of the power transmitting apparatus;

Figure 1:
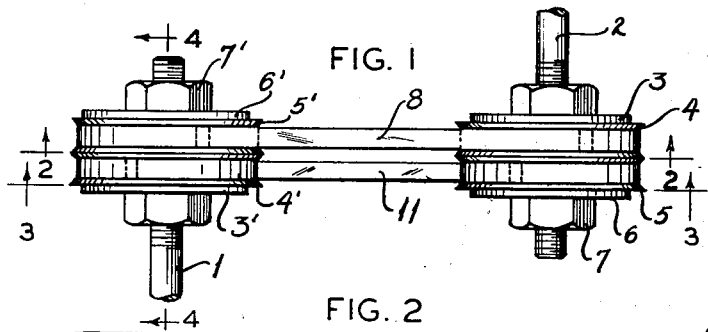

Numerals 1 and 2 designate shafts of different portions of apparatus which are to be operated in synchronism. Shaft 2 may be regarded as the driving shaft and shaft 1 may be regarded as the driven shaft, preferably spaced apart as illustrated. The end of shaft 2, for example, is threaded and has a nut thereon and a plate 3 and a pulley 4 are arranged on the shaft in the order mentioned. Another pulley 5 is assembled on shaft 2 so that it is in frictional engagement with pulley 4. A plate 6 on shaft 2 engaging pulley 5 is engaged by nut 7 threaded on shaft 2 and is intended to lock the several members, whose adjacent surfaces abut, in frictional engagement.

The pulley arrangement on shaft 1 is identical with that of shaft 2 and the corresponding parts are designated by primed reference numerals. Connected between pulleys 4 and 5' and 5 and 4' on shafts 1 and 2, respectively, are power transmitting elements preferably in the form of non-elastic flexible tapes or ribbons 8 and 11, each of which is anchored at its ends to the connected pulleys by means of a pin 9 extended through a loop formed in tape 8, the loop and pin being assembled in an aperture formed in pulley 4 and with the tape being led to the aperture through a slot 10 which has a width slightly more than twice the thickness of the tape.

Figure 2:
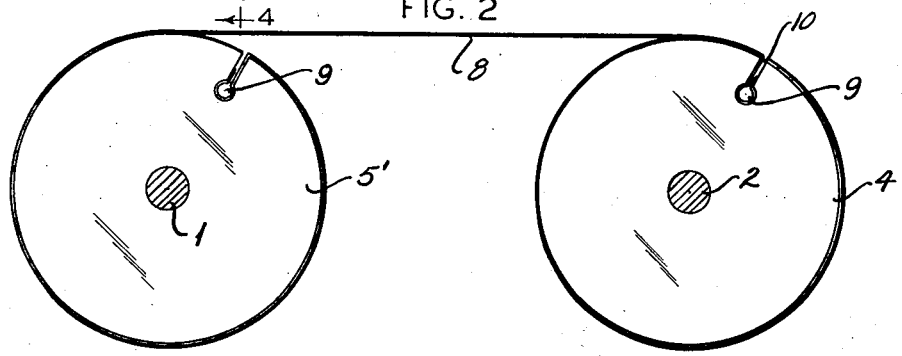
Figure 2 is a view taken generally along the line 2—2 of Figure 1.
Figure 3:
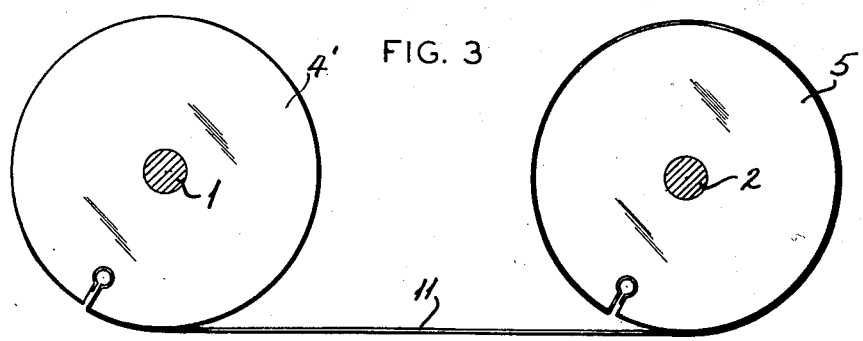
Figure 3 is a view taken substantially along the line 3—3 of Figure 1.
Figure 4:
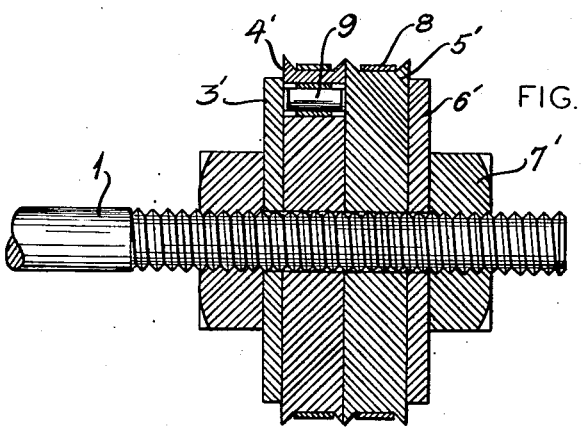
Figure 4 is a view taken substantially along the line 4—4 of Figure 1.

The anchors for the tapes are preferably arranged on the pulleys in the geometric relation illustrated in Figures 2 and 3 as substantially 180° apart although other angular relations between the anchors and the cooperating pulleys may be employed. The tape 8 is initially assembled on pulleys 4 and 5' mounted on shafts 1 and 2, respectively, and when one of the pulleys is held against rotation, the other pulley may be rotated relatively to its shaft by loosening nut 7 or 7' in order to properly tension tape 8. While this tension is being held, tape 11 on pulleys 4' and 5 on shafts 1 and 2, respectively, is similarly tightened by rotating one of the pulleys on the shaft and when tape 11 is properly tensioned, nuts 7, 7' on each shaft are then tightened to thereby bring the adjacent faces of the pulleys into frictional engagement with each other in order to prevent relative rotation of pulleys 4, 5 and 4', 5' on each shaft. Plates 3 and 6 assist in maintaining the frictional engagement and also prevent the removal of pins 9 from the pulley apertures in which they are inserted. The installation of the tapes 8 and 11 is so made that pulley 5' of Figure 2 contains substantially a full wrap of tape on its periphery while pulley 4 has only a small segment of its periphery in contact with the tape as illustrated. Similarly, pulley 5 of Figure 3 has a substantially full wrap of tape on its periphery while pulley 4' has only a small segment of its periphery in contact with the tape. The placing of substantially more than one complete lap of the tapes on pulleys 5' and 5 will allow shafts 1 and 2 to make more than 360° of rotation without appreciable loss of synchronism. It is thereby apparent that rotational movement may be transmitted from shaft 2 to shaft 1 such that there will be no backlash between tapes 8 and 11 and thereby cause shafts 1 and 2 to rotate in synchronism.

The drawings show a pair of pulleys mounted on each shaft. It is evident that one of the pairs of pulleys may be replaced by a single pulley having a width substantially equal to a pair of pulleys and secured against rotation relative to the shaft on which it is mounted. This single pulley is aligned with the pulleys of the other pair and two tapes are connected to them in the same manner as described and illustrated in connection with Figures 2 and 3. In order to tension the tapes, the pulleys of said pair of pulleys are rotated relatively to each other until the desired degree of tension is produced in the tapes whereupon said pair of pulleys are locked to the shaft to prevent relative rotation and thereby cause the shafts to rotate in synchronism.

Having fully described my invention, what I claim as novel and desire to protect by Letters Patent of the United States is:

1. In a mechanism for transmitting power from a shaft to a second shaft laterally displaced therefrom; a pair of pulleys mounted on one of said shafts, each pulley of said pair being rotatable relatively to the shaft; pulley means on the other shaft; flexible means for connecting each pulley of said pair to said pulley means on the second shaft; and means for clamping said pulleys together and for locking said pair of pulleys against rotation relative to its shaft.

2. In a mechanism for transmitting power from a shaft to a second shaft laterally displaced therefrom; a pair of pulleys on each shaft, the pair of pulleys on one of said shafts being rotatable relatively to their shaft; flexible means for connecting a pulley of one pair with a pulley of the other pair; another flexible means for connecting the other pulleys of each pair; and means for clamping said pulleys together and for locking the relatively rotatable pulleys against rotation on their shaft.

3. In a mechanism for transmitting power from a shaft to a second shaft laterally displaced therefrom; a pair of pulleys mounted on each shaft, each pulley being rotatable relatively to its shaft and in alignment with a pulley of the other pair; flexible means connecting aligned pulleys; and means for clamping the pulleys of each pair together and to lock each pair of pulleys against rotation relative to its shaft.

4. A power transmitting mechanism comprising a pair of laterally displaced shafts; two pulleys mounted on each shaft, each pulley being rotatable relatively to its shaft; a tape for connecting a pulley on one shaft with a pulley on the other shaft; a tape for connecting the other pulleys on each shaft; means to anchor the end of each tape to its associated pulley; and means for clamping the pulleys of each pair together and for locking the pulleys on each shaft against rotation relative to their shaft.

5. A power transmitting mechanism comprising a shaft laterally displaced from another shaft; a pair of pulleys on each shaft, each pulley of each pair being rotative relative to each other and to the shaft on which they are mounted, a pulley on one shaft being in alignment with a pulley on the other shaft; a flexible member for connecting each of the aligned pulleys; means to anchor the ends of said flexible members to their associated pulley, each of said anchoring means comprising a pin inserted through a loop in said flexible member and which is inserted in an aperture formed in each of said pulleys, the pulleys on one shaft when rotated relatively to said shaft tightening said flexible members; and means for clamping the pulleys of each pair together and to lock each pair of pulleys to its shaft.

6. A power transmitting mechanism comprising a shaft laterally displaced from another shaft; a pair of pulleys on each shaft, each rotatable relative to each shaft, the pulleys on each shaft being in alignment with the pulleys of the other pair; a flexible member for connecting each of the aligned pulleys; means to anchor the ends of said flexible members to each of said pulleys, said flexible members wrapped substantially about one pulley of each pair before anchoring in order to permit a 360° rotation of one of said shafts, said pulleys when rotated relatively to each other permitting tightening of said flexible members; and means for clamping the pulleys of each pair together and to lock the pulleys of each pair to their shafts.

7. The combination with two laterally displaced shafts, means for driving each shaft from the other in one direction of rotation from an original position through 360° of rotation, said means comprising pulleys and two associated flexible force transmitting tapes, each pulley connected to a tape being capable of rotatable adjustment with respect to its shaft for adjusting the tension of said tape and the relative position of each pulley on its shaft; and means for securing said pulleys to their respective shafts after adjustment.

JAMES S. MALSBARY.

REFERENCES CITED

The following references are of record in the file of this patent:

UNITED STATES PATENTS

| Number | Name | Date |
|---|---|---|
| 841,161 | Lewis | Jan. 15, 1907 |
| 848,183 | Luke | Mar. 26, 1907 |
| 1,245,104 | Holmes | Oct. 30, 1917 |
| 2,094,999 | McLaughlin et al. | Oct. 5, 1937 |
| 2,120,624 | Pearson | Jan. 14, 1938 |
| 2,212,823 | Bulk | Aug. 27, 1940 |
| 2,276,935 | Como | Mar. 17, 1942 |

FOREIGN PATENTS

| Number | Country | Date |
|---|---|---|
| 323,691 | France | Aug. 16, 1902 |
| 742,606 | France | Jan. 4, 1933 |